(12) United States Patent
Bryborn

(10) Patent No.: US 7,162,087 B2
(45) Date of Patent: Jan. 9, 2007

(54) METHOD AND APPARATUS FOR RECORDING OF ELECTRONIC HANDWRITING

(75) Inventor: Mattias Bryborn, Lund (SE)

(73) Assignee: Anoto AB, Lund (SE)

( * ) Notice: Subject to any disclaimer, the term of this patent is extended or adjusted under 35 U.S.C. 154(b) by 731 days.

(21) Appl. No.: 10/329,797

(22) Filed: Dec. 27, 2002

(65) Prior Publication Data

US 2003/0122802 A1    Jul. 3, 2003

Related U.S. Application Data

(60) Provisional application No. 60/346,998, filed on Jan. 11, 2002.

(30) Foreign Application Priority Data

Dec. 28, 2001    (SE)    .................................... 0104456

(51) Int. Cl.
*G06K 9/00*    (2006.01)
(52) U.S. Cl. ...................... 382/187; 345/173; 382/186; 382/241
(58) Field of Classification Search ................ 382/119, 382/186, 187, 198, 241; 345/173
See application file for complete search history.

(56) References Cited

U.S. PATENT DOCUMENTS

| | | | |
|---|---|---|---|
| 4,718,103 A | | 1/1988 | Shojima et al. |
| 6,052,481 A | * | 4/2000 | Grajski et al. ............... 382/187 |
| 6,101,280 A | | 8/2000 | Reynolds |
| 6,556,694 B1 | * | 4/2003 | Skoog .......................... 382/119 |

FOREIGN PATENT DOCUMENTS

| | | |
|---|---|---|
| EP | 0 848 350 A1 | 6/1998 |
| WO | WO 94/03853 A1 | 2/1994 |
| WO | WO 00/73983 A1 | 12/2000 |
| WO | WO 01/16691 A1 | 3/2001 |
| WO | WO 01/26032 A1 | 4/2001 |
| WO | WO 01/26033 A1 | 4/2001 |
| WO | WO 01/71473 A1 | 9/2001 |

OTHER PUBLICATIONS

"Algorithms for the Reduction for the Number of Points Required to Represent a Digitized Line or its Caricature", David H. Douglas and Thomas K. Peucker, *The Canadian Cartographer* vol. 10, No. 2, Dec. 1973, pp. 112-122.
"Introduction to Data Compression" (second edition, Chapters 3 and 4), Morgan Kaufmann Publishers, Kalid Sayood.
"Scientific Computing: An Introductory Survey" (section 7.2), Michael T. Heath, McGraw-Hill, ISBN 0-07-115336-5.

* cited by examiner

*Primary Examiner*—Gregory Desire
(74) *Attorney, Agent, or Firm*—Birch, Stewart, Kolasch & Birch, LLP

(57) ABSTRACT

According to a method for recording of electronic handwriting, a handwriting movement is digitized into a sequence of points along a writing curve that corresponds to the handwriting movement. The sequence of points is resampled by eliminating those points that are judged not to be necessary for being able to reconstruct the writing curve later with the required visual quality. A resampled representation of the writing curve is created from the points remaining—that is not eliminated—after the resampling. The resampling is carried out on successive and partially overlapping partial sequences of the points, the resampled representation of the writing curve being extended successively after resampling of a respective partial sequence.

17 Claims, 6 Drawing Sheets

METHOD AND APPARATUS FOR RECORDING OF ELECTRONIC HANDWRITING

This application claims benefit of Provisional 60/346,998 filed Jan. 11, 2002.

FIELD OF THE INVENTION

The present invention relates to electronic recording of handwritten information. More specifically, the invention relates to recording of electronic handwriting, where a handwriting movement is digitized into a sequence of points along a writing curve that corresponds to the handwriting movement, where the sequence of points is resampled by eliminating those points that are judged not to be necessary for being able to reconstruct the writing curve later with the required visual quality, and where a resampled representation of the writing curve is created from the points remaining—that is the points that have not been eliminated—after the resampling.

BACKGROUND ART

Today electronic recording of handwritten information has many applications. An example of a writing tool suitable for this purpose is described in WO 01/71473 in the form of an electronic pen. An electronic pen will be used throughout this document to represent a writing tool suitable for recording handwritten information, without the invention in any way being restricted to such a pen.

Electronic pens are intended to be used in hand-held and portable applications, and for this reason, because of consequent restrictions on power consumption, space and cost, it is necessary to store the recorded electronic handwriting as efficiently as possible and in a way that uses as little memory as possible.

U.S. Pat. No. 6,101,280 describes a method and a device for compressing electronic handwriting, consisting of a sequence of pen strokes, each of which constitutes a sequence of pairs of (x, y)-coordinates for points arranged (sampled) in time order along the pen stroke. In order to specify each pair of coordinates with adequate resolution, nominally one 16-bit integer is required for the x-coordinate and the y-coordinate, respectively. Prior-art technique, including that from U.S. Pat. No. 6,101,280, shows, however, a series of measures that can be taken in order to reduce the storage space required for the pen strokes.

By not storing the points' coordinates as absolute values but instead as difference or delta values relative to the immediately preceding point, a considerable reduction in data is achieved. It is normally sufficient to have 8 bits per relative coordinate, compared to twice that for absolute coordinates. Even better data reduction is achieved by making use of some form of prediction or extrapolation, for example polynomial approximation, of the expected position of a given point based on a number of preceding points in the sequence. Each point will thus be represented by the error or deviation between its expected position and its current position.

Before the final storage of the coordinates of the recorded points, the use is known of data-compressing source coding—often statistical coding such as Huffman coding or arithmetic coding—of the coordinates that have been relative coded in accordance with the above.

Even before the relative coding and the data-compressing source coding, U.S. Pat. No. 6,101,280 shows, however, that many of the recorded points can be eliminated without significantly worsening the visual quality when the electronic handwriting is later to be recreated, for example displayed on a screen. For this purpose, so-called resampling of the sequence of recorded points is carried out. The Douglas-Peucker's algorithm is often used for resampling a discrete curve, for example consisting of a sequence of points along a recorded pen stroke, and this is carried out in the following way. A curve segment between a first point and a second point, which is located at a distance from the first point, has a straight line drawn experimentally between the first and the second point. If the maximal distance between this line and any point on the curve segment is less than a limit value, the curve segment is replaced by the straight line. A straight line can be represented by considerably less data than a curve segment, whereby the saving in storage space is evident. On the other hand, if the maximal distance exceeds the limit value, a first shorter line is created between the first point and a midpoint on the curve segment and a second shorter line is created between this midpoint and the second point, the above procedure being repeated recursively on these shorter lines. After the resampling has been concluded, only those points that have not been replaced by a line are saved. The curve segment is thus represented by these points remaining after the resampling.

Although the resampling procedure in U.S. Pat. No. 6,101,280 is fully capable of real data reduction, it is still associated with certain disadvantages. As the resampling is not carried out until a complete pen stroke, from "pen-down" to "pen-up", has been entered by the user, it can often be a question of long sequences of points and thus large amounts of coordinate data that have to be processed at one and the same time during the resampling. The storage and processing of large amounts of coordinate data require of course the available working memory to be sufficiently large. It is, however, far from the case that an electronic pen or a similar portable miniaturized handwriting device has a large working memory; on the contrary, the constant market demands for low cost/small size/low power consumption mean that the working memory of the pen (or the like) often has a limited storage capacity. In order to be able also to carry out resampling of long sequences of points (long pen strokes) it is thus necessary for the pen to be provided with a working memory that is (over-)dimensioned for the worst case scenario, or it is necessary not to carry out resampling of sequences of points that are too long. Both alternatives have evident disadvantages.

Another disadvantage of the resampling in accordance with the above is that time delays can arise for the resampling, the subsequent point coordinate coding and the storage, for example if the user pauses while making a pen stroke without lifting the pen. Only later, once the pen stroke has been completed and the pen has been lifted from the writing base, can the sampling and the subsequent operations commence.

SUMMARY OF THE INVENTION

A main object of the invention is therefore to remedy or at least reduce the above-mentioned problems that are associated with resampling a digitized pen stroke or a similar writing curve.

The object of the invention is in particular to make it possible to resample long sequences of points in spite of a limited available working memory, which resampling is in addition to be initiated and implemented quickly, even if there is a pause during the pen stroke.

More specifically, these objects are achieved by means of a method, an apparatus and a computer program product for recording of electronic handwriting according to the independent claims.

A first aspect of the invention is thus a method for recording of electronic handwriting, where a handwriting movement is digitized into a sequence of points along a writing curve that corresponds to the handwriting movement. The sequence of points is resampled by eliminating those points that are judged not to be necessary for being able to reconstruct the writing curve later with the required visual quality. A resampled representation of the writing curve is created from the points remaining—that is not eliminated—after the resampling. The resampling is carried out on successive and partially overlapping partial sequences of the points, and the resampled representation of the writing curve is extended successively after resampling of a respective partial sequence.

The thus obtained resampled representation of the writing curve may be stored as digital data in any storage means, including but not limited to a register in a processor (CPU), a cache memory, a random access memory or a persistent memory, either permanently or temporarily (the latter case including streaming or other transmission of said digital data from one device to another).

The resampling is carried out according to a preferred embodiment using a line-generalization algorithm, such as the Douglas-Peucker's algorithm, for polygonal approximation of the writing curve, the curve segment between two consecutive remaining points being represented by a straight line.

According to a preferred embodiment, where a partial sequence comprises n points, the overlap between two consecutive partial sequences is w points, and 1<w<=n/2, an individual partial sequence is stored during the resampling of the same in a memory buffer with room for n points, after which the last w points in this individual partial sequence are left in the memory buffer and are included in the resampling of a next following partial sequence. After the resampling of said individual partial sequence, the remaining—that is not eliminated—points in the memory buffer are added to the resampled representation of the writing curve, with the exception of the remaining points from a subset of said last w points in said individual partial sequence, which instead are included in the resampling of a next following partial sequence as regards addition to the resampled representation of the writing curve.

More specifically, the preferred embodiment comprises the steps of a) filling the memory buffer with points;

b) applying the line-generalization algorithm to the points in the memory buffer, wherein such remaining points are marked which are not eliminated by the algorithm;

c) letting the marked points from the points 1 to n−x in the memory buffer be incorporated in the resampled representation of the writing curve;

d) deleting the first n−w points in the memory buffer;

e) placing the remaining w points at the start of the memory buffer;

f) as long as points are available for resampling:

f1) filling up the memory buffer with n−w new points;

f2) applying the line-generalization algorithm to the points in the memory buffer, in accordance with step b);

f3) letting the marked points from the points w−x to n−x in the memory buffer be incorporated in the resampled representation of the writing curve;

f4) deleting the first n−w points in the memory buffer; and f5) placing the remaining w points at the start of the memory buffer; and g) letting the marked points from the remaining points n−x+1 to n in the memory buffer be incorporated in the resampled representation of the writing curve.

Based on the resampled representation of the writing curve, the remaining points can advantageously be relative coded and compressed using statistical coding. This is advantageously carried out as soon as the handwriting movement has been digitized into a predetermined number of points. Alternatively, the resampled representation of the writing curve can be stored as a data set in a memory.

As the resampling according to the invention works in stages with partially overlapping sequences of points, and as results from the individual resamplings are compiled as a combined data representation of the recorded and sampled sequence of points, this makes it possible for the resampling to be used also in electronic pens (and the like) with limited working memory.

The invention has in addition an advantage relating to speed, as the resampling may be initiated as soon as a point-coordinate buffer in the working memory has been filled with recorded points to a sufficient extent.

Another advantage of the invention is its ability to avoid or minimize, automatically, artefacts at "knot points"—points that represent a sharp bend or a sudden change of direction in the handwriting, for example in the form of a sharp tip or a little loop with a tight bend. In fact, such points are often particularly important to legibility, and it is thus desirable to prevent them from being unintentionally eliminated during the resampling. "Knot points" are dealt with in the above-mentioned U.S. Pat. No. 6,101,280, but in a way that is resource-intensive—"knot points" are explicitly searched out in the sequence of recorded points prior to the resampling which is then based on identified "knot points".

The invention can finally be summarized as a new and innovative method for resampling a sequence of recorded points "on the fly" or in real-time, that is in immediate association with ongoing digitizing of a handwriting movement, the method being carried out using a sliding and partially overlapping window.

A second aspect of the invention is an apparatus for recording of electronic handwriting, comprising digitizing means, resampling means and a memory, said digitizing means being arranged to digitize a handwriting movement into a sequence of points along a writing curve corresponding to the handwriting movement and said resampling means being arranged to eliminate those points in the sequence of points that are judged not to be necessary for being able to reconstruct the writing curve later with the required visual quality, and to create a resampled representation of the writing curve from the points remaining—that is not eliminated—after the resampling. Said resampling means is arranged to carry out the elimination of points for successive and partially overlapping partial sequences of points, and to extend the resampled representation of the writing curve successively after resampling a respective partial sequence.

The control unit of the apparatus can advantageously be arranged to carry out the method according to the first aspect of the invention. It can also advantageously be designed as an electronic pen.

A third aspect of the invention is a computer program product that can be directly read into a memory associated with a processor, comprising program code for carrying out steps according to the first aspect of the invention.

The second and third aspects of the invention have essentially the same advantages as the first aspect.

Other objects, advantages and characteristics of the invention are apparent from the following detailed description of the invention, from the appended claims and from the drawings.

BRIEF DESCRIPTION OF THE DRAWINGS

The invention will now be described in more detail with reference to the accompanying drawings.

DETAILED DESCRIPTION OF THE INVENTION

By way of introduction, general information is given about the different components of the invention. Later follows a more detailed description of the invention.

Figure 1:
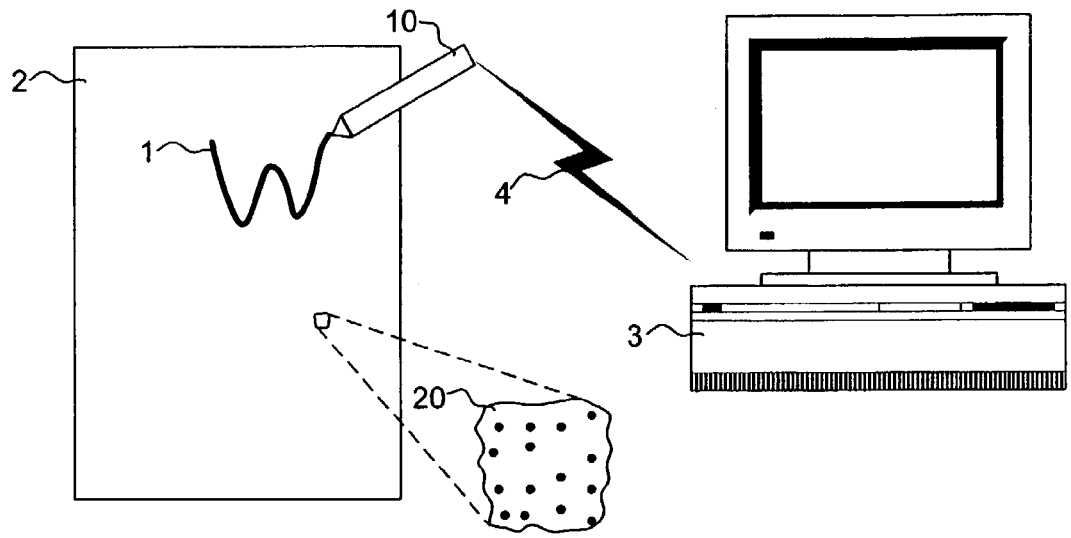
FIG. 1 is a schematic overview of a system for electronic recording of handwriting according to an embodiment, comprising among other things an electronic pen and a server for receiving entered information from the pen.

A system for electronic recording of handwriting is shown in FIG. 1. An electronic pen 10 is utilized in the system, which pen will be described in greater detail with reference to FIG. 2. When the user moves the pen 10 in the required pen movements 1 across a writing base 2, the pen movements are recorded as a plurality of digital pen strokes, which can be stored locally in the pen awaiting later transmission to a server 3 via a wireless communication link 4. In order to make this recording possible, the writing base 2 is provided with a position-coding pattern 20, which will be described in greater detail with reference to FIG. 3. A possible application, among many others, is that the handwriting entered by means of the pen movements 1 is incorporated in or attached to an e-mail message in the form of an image object of any common type (for example JPEG, GIF, SVG, PNG or TIFF), which is transmitted via a global network (WAN—"Wide Area Network", for example the Internet) to a recipient specified by the user of the pen. Another application can be that the entered handwriting undergoes computerized text interpretation (ICR—"Intelligent Character Recognition") in the server 3 or in some other local or remote device, including but not limited to a personal computer, a mobile telephone or a portable digital assistant, with or without the use of a network for transmitting the entered handwriting. Another application may be that the handwriting is simply displayed on a screen of the server 3, or of said local or remote device.

Irrespective of the application, the handwriting recorded by the pen 10 is generally stored temporarily in the pen, before it is transferred to the server 3, etc., at a given time.

Figure 2:
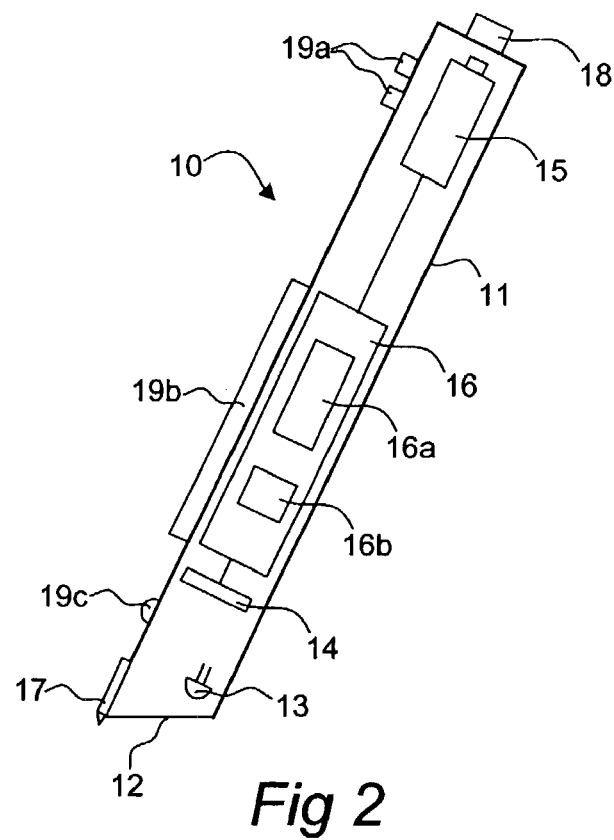
FIG. 2 is a schematic drawing of the electronic pen in FIG. 1.

In the following, a short description is given of the general components in the electronic pen 10 with reference to FIG. 2. A more complete description of the pen 10 is given in WO 01/16691, WO 01/26032 and WO 01/26033, which are herewith incorporated in their entirety by reference.

The electronic pen 10 has a casing or a pen body 11 which has approximately the same shape as the casing of a conventional marker pen. One end of the casing has a window 12, through which images are recorded. The casing 11 contains principally an optics part, an electronics part and a power supply.

The optics part comprises at least one illuminating light source 13, a lens system (not shown in the Figure) and an optical image reader 14. The light source 13, suitably a light-emitting diode, illuminates a part of the base 2 which can be viewed through the window 12, preferably by means of infrared light or alternatively light of some other wavelength. The base 2 is provided with the position-coding pattern 20. An image of the base 2 is projected on the image reader 14 by means of the lens system.

The power supply for the sensor device 10 is advantageously a battery 15, which alternatively can be replaced by or supplemented by mains power (not shown).

The electronics part 16 comprises a control unit 16a to which a storage means 16b is connected. The control unit 16a is responsible for the different functions in the electronic pen 10 and can advantageously be implemented by a commercially available microprocessor such as a CPU ("Central Processing Unit"), by a DSP ("Digital Signal Processor") or by some other programmable logical device, such as an FPGA ("Field Programmable Gate Array") or alternatively an ASIC ("Application-Specific Integrated Circuit"), discrete analog and digital components, or some combination of the above.

A conventional pen point 17 is arranged on the casing 11. By means of the pen point 17, the user can write or draw physically on the base 2 by an ordinary pigment-based marking ink being deposited on the surface. The marking ink in the pen point 17 is suitably transparent to infrared light in order to avoid interference with the opto-electronic detection in the electronic pen 10.

The electronics part comprises in addition a combined transmitter and receiver (transceiver) 18 for sending information to and from a remote device, such as a computer or mobile telephone, or the server 3. The combined transmitter and receiver 18 is advantageously arranged for short-range radio communication in accordance with the Bluetooth standard at 2.4 GHz in the ISM frequency band ("Industrial, Scientific and Medical"). The combined transmitter and receiver can, however, alternatively be arranged for infrared communication, such as IrDA ("Infrared Data Association"), or for cable-based communication (such as USB or RS232), or essentially for any other available standard for short-range communication between a handheld device and a remote device.

Even though the transmission of information in one embodiment takes place directly between the pen 10 and the server 3, it is to be noted that this can just as well take place via an intermediate device, for example a mobile telephone, a handheld computer or a portable personal computer. In such a case, the intermediate device is provided with a combined transmitter/receiver corresponding to the transmitter/receiver 18 in the pen 10, by means of which information can be transmitted from the pen to the intermediate device. The latter is also provided with a suitable interface for communication with the server 3—for example a network card (for communication via a local or global network), or alternatively an analog or digital modem (for communication via a cable-based fixed telephone network, a mobile telephone network or a satellite telephone network). In this way, the information from the pen can be forwarded to the server 3 by this intermediate device.

In addition, the electronics part can comprise buttons 19a, by means of which the user can control the functions in the electronic pen 10. The electronic pen 10 can also comprise a display 19b, such as a liquid crystal display, and a lamp 19c for indicating status.

Figure 4:
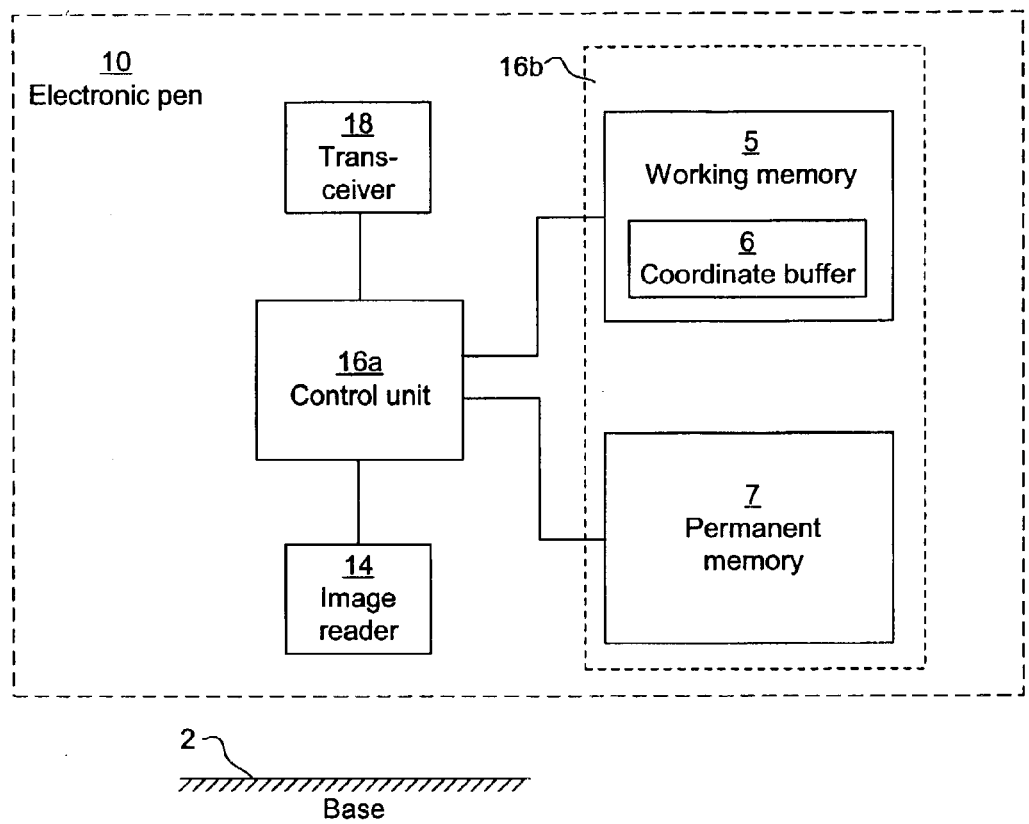
FIG. 4 shows a block diagram of some of the components of the electronic pen in FIG. 1.

The electronic pen 10 is illustrated further in FIG. 4. The pen's storage means 16b consists as shown of two parts, a working memory 5 and a permanent memory 7. A part of the working memory 5 is taken up by a coordinate buffer 6 for temporary storage of a partial sequence of digitized points during resampling. The working memory 5 is also used in a conventional way by the control unit 16a for reading in program instructions prior to execution and for storage of associated program variables, data structures and temporary results.

The permanent memory 7 contains the set of program instructions which together, during execution by the control unit 16a, are capable of carrying out the resampling method according to the preferred embodiment, and also a representation of a resampled writing curve, which is extended successively by results from the resamplings of the individual partial sequences of points. The complete representation of a resampled and, in the preferred embodiment, compressed writing curve can later be transmitted to the server 3 in the way described above, or alternatively can be streamed over successively to the server 3 as soon as a respective partial sequence of points has been resampled and compressed.

The storage means 16b can in addition also comprise other types of memory, for example a read only memory (ROM). The different types of memory can either be realized as physically different memories such as RAM, SRAM, DRAM, EEPROM, flash memory, etc, or the different types or functions of memories can be implemented as a combined physical memory.

Figure 3:
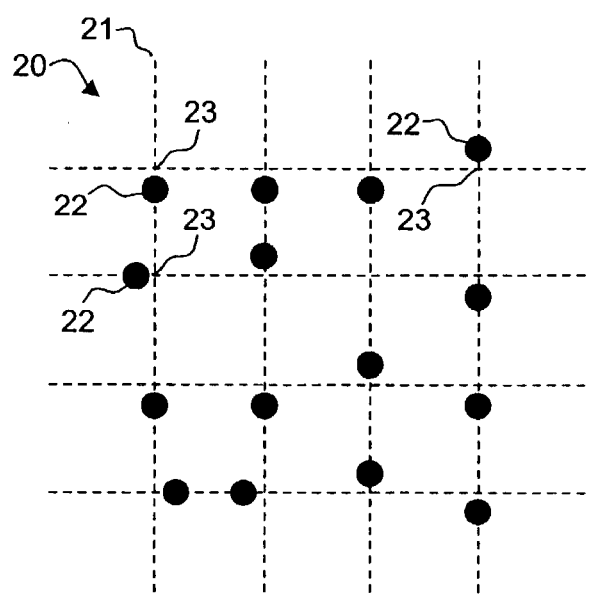
FIG. 3 is a schematic drawing of a position-coding pattern, which is applied to a writing base for the electronic pen in FIG. 1.

With reference to FIG. 3, the position-coding pattern comprises a virtual raster pattern 21, around which a plurality of marks 22 are placed. Each mark represents one of four possible values from 1 to 4. The value of each mark is represented by its actual position 22 in relation to its nominal position 23, the latter being at the intersection between a horizontal and a vertical line in the raster pattern 21. Thus, each mark 22 can be located in one of four different positions which are separated from each other in orthogonal directions from the nominal position 23. The distance is suitably not less than about ⅛ and not more than about ¼, preferably about ⅙, of the distance between two opposite raster lines.

The distance between the raster lines can, for example, be about 300 micrometers or about 254 micrometers. The latter distance is particularly suitable for printers and scanners, which often have a resolution that is a multiple of 100 dpi (dots per inch).

Each mark 22 consists of an essentially circular dot with a radius that is preferably between about 25% and about 120% of the distance between the dots and the nominal position 23. Alternatively, the marks 22 can be other geometric shapes than circular, such as rectangular, triangular, elliptical, and can in addition be solid or open.

The position-coding pattern 20 can be constructed so that it codes a very large number of absolute positions. For example, 6×6 adjacent marks can in combination code a position with x- and y-coordinates. By providing the surface on the base 2 with the position-coding pattern 20, an electronic representation can be obtained of the information that is written or drawn on the base using the electronic pen 10 by repeatedly producing images of the surface when the pen 10 is moved across the surface. In these images, the marks 22 will appear as foreground objects, while the rasters 21 are only virtual and will not appear in the images.

Position-coding patterns of the type outlined above are described in greater detail in WO 01/16691, WO 01/26032 and WO 01/26033. An alternative position-coding pattern is shown in WO 00/73983. All these documents are herewith incorporated in their entirety by reference.

A way of working 50 for processing electronic handwriting using the electronic pen 10 and the server 3 according to a preferred embodiment of the invention will now be described with reference to FIG. 5. The steps 51–54 are carried out in the pen 10, while the steps 56–58 are carried out in the server 3.

Figure 1A:
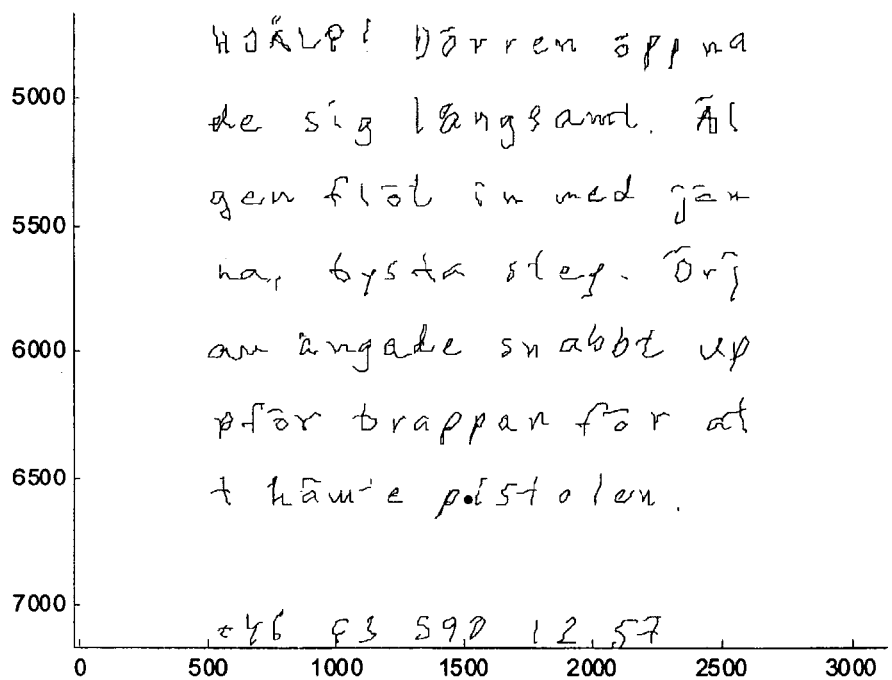
FIG. 1a illustrates an example of information—in the form of a handwritten piece of text in the Swedish language—that can be recorded using an electronic pen according to FIG. 1.
Figure 7:
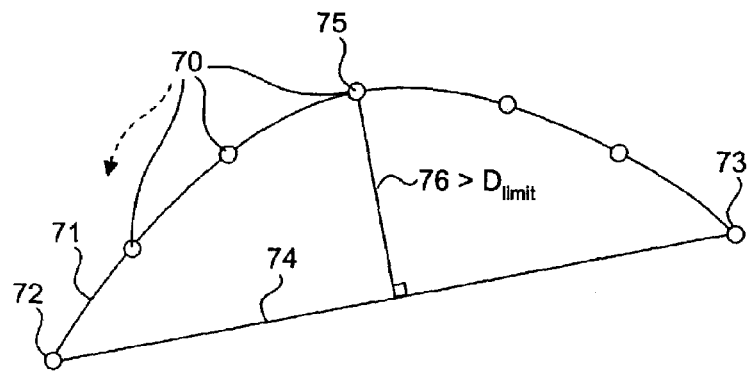
FIGS. 7 and 8 illustrate schematically the principle of resampling recorded points along the curve of a writing movement according to the Douglas-Peucker's algorithm.

In a first step 51, the pen 10 records continuously images of the base 2 (see FIG. 1), when the user moves the pen in at least one writing movement 1. In practice, the user will carry out a large number of writing movements, each representing wholly or partially for example a letter, a number or a symbol comprised in a piece of text, for example according to FIG. 1a. In order to make this easier to understand, the remainder of the way of working 50 is, however, described with the simplified assumption that only one writing movement 1 is carried out by the user. Using the position-coding pattern 20, the pen's electronics part 16 determines a sequence of digital points 70 (see FIG. 7) along the writing movement 1. In other words, the physical writing movement 1 is represented electronically by the sequence of digital points 70, which can be said to create a writing curve 71 corresponding to the writing movement 1.

In a second step 52, a resampling is carried out of the sequence of digital points 70 by certain individual points being eliminated, these points not being necessary for providing sufficiently good quality in later reconstruction of the writing curve. The resampling according to the invention is illustrated in greater detail in FIGS. 6–10 and will be described in greater detail later.

Thereafter, further compression of the resampled sequence of points is carried out in a step 53, which actually consists of two operations—difference coding followed by source coding. None of these operations constitutes any central part of the invention, but for the sake of completeness a summary is given in the following.

The difference coding according to the preferred embodiment is carried out in the following way for a sequence of points. By way of introduction, the x- and y-coordinates are obtained for a current point $p(n)$ that is to be difference coded, expressed in absolute 16-bit values. Thereafter a polynomial $G(n)$ of order N is approximated to the N+1 preceding points $p(n-1)$, $p(n-2)$, ..., $p(n-N-1)$ in the sequence of points. The polynomial approximation is a thoroughly well-known concept within mathematics and is described, for example, in section 7.2 in "Scientific Computing—An Introductory Survey", Michael T. Heath, McGraw-Hill, ISBN 0-07-115336-5. Tests have shown that polynomials of order 1 or 2 are optimal for the current digitizing speeds (which are often in the range 70–100 Hz). In addition, it has been found that polynomials of order 1 are preferable when the sequence of points has undergone resampling. As this is the case in the preferred embodiment, this is based on polynomial approximation with first order polynomials; in other words N=1 and a straight line is approximated to the N+1=1+1=2 immediately preceding points p(n−1) and p(n−2) in the sequence of points.

As the points in the sequence of points have known time-related distances which are determined by the digitizing frequency and which, in addition, are indicated in association with the resampling, a predicted point $p_{pred}(n)$ can be determined by extrapolating the graph (in this case the straight line) for the polynomial G(n). In addition, a deviation D(n) is determined between the actual point p(n) and the predicted point $p_{pred}(n)$.

Then the determined deviation D(n) is coded using a data-compression method for statistical source coding such as Huffman coding or arithmetic coding, both of which are well-known principles within the field of information theory. More specifically, the deviation's x- and y-coordinates, $D_x(n)$ and $D_y(n)$ respectively, are coded individually using statistical source coding. In the preferred embodiment, Huffman coding is used, but other statistical source coding, such as arithmetic coding, can alternatively be used. Huffman coding is described in detail in, for example, "Introduction to Data Compression", second edition, Chapter 3, Khalid Sayood, Morgan Kaufmann Publishers, 2000. Arithmetic coding is described in Chapter 4 of the same book.

Figure 5:
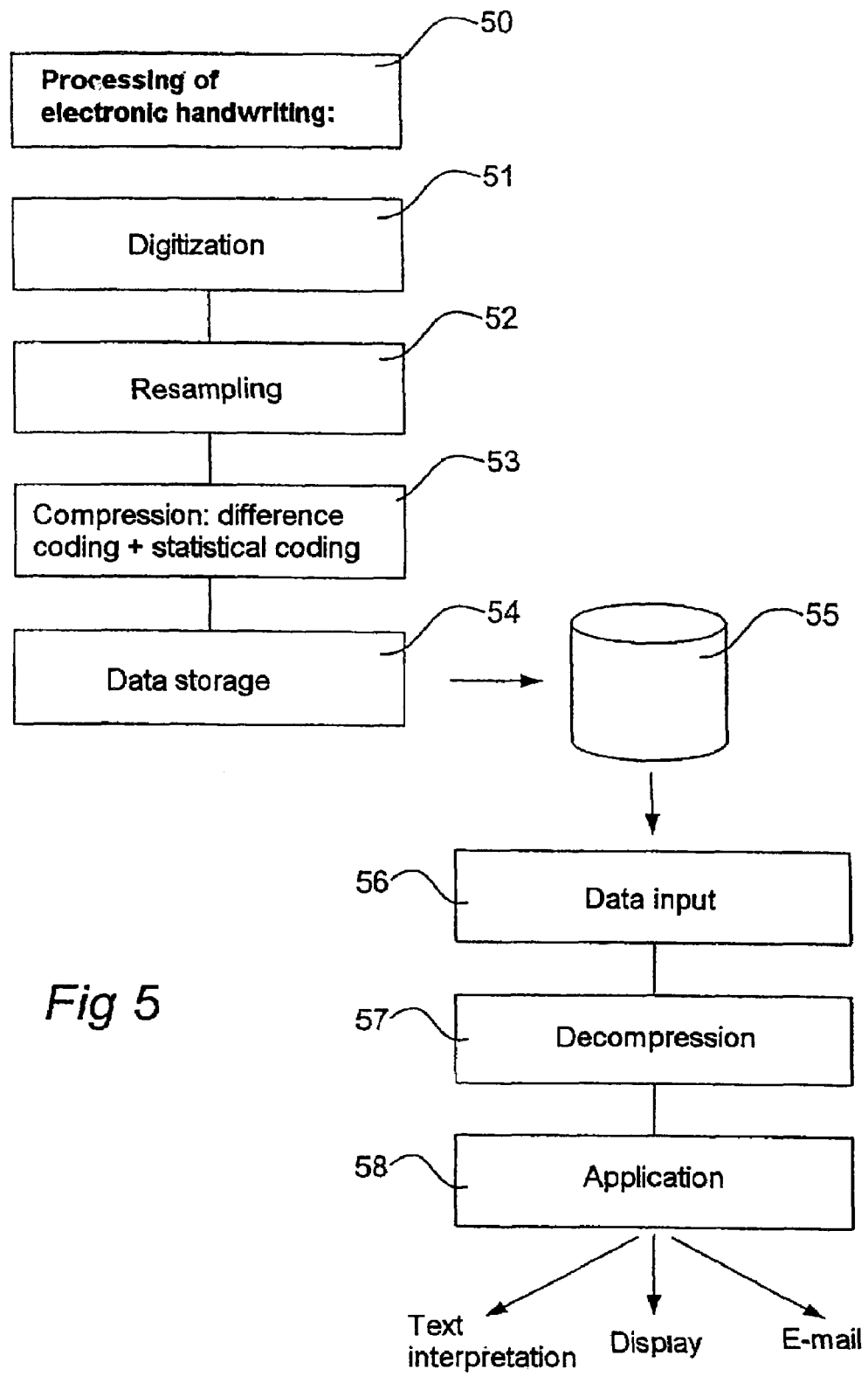
FIG. 5 shows a general flow chart for processing of electronic handwriting, the present invention pertaining to a resampling phase in this processing.

Finally, the compressed deviation $D_{packed}(n)$ is stored in the storage means 16b for subsequent transmission, at a given time, via the wireless communication link 4 (FIG. 1) to a secondary memory in the server 3—in FIG. 5 represented symbolically by 55.

When the electronic handwriting thus recorded and transmitted to the server 3 is later to be reproduced, the stored, compressed, difference-coded data is first read in a step 56. Thereafter, a decoding of this data is carried out in a step 57, which essentially consists of the counterpart of operations in the compression step 53. Once the electronic handwriting has been decoded, the current use of the handwriting follows in a step 58, for example in the form of text interpretation of the handwriting, visual presentation of the same on a display screen or transmission of the handwriting as an image object in an e-mail message.

In the preferred embodiment, the resampling is carried out according to the previously described Douglas-Peucker's algorithm. This algorithm is, as has already been mentioned, well-known—an application is described, for example, in U.S. Pat. No. 6,101,280—however, it is applied here according to the invention in a new and innovative way. Basic information about the Douglas-Peucker's algorithm can be obtained in "Algorithms for the reduction of the number of points required to represent a digitized line or its caricature", D. Douglas and T. K. Peucker, 1973, The Canadian Cartographer, Vol. 10, No. 2, pp 112–122. The basic principle for the Douglas-Peucker's algorithm can be summarized briefly in the following way with reference to FIGS. 7 and 8:

A curve segment (the writing curve 71), consisting of a sequence of points 70 along a recorded pen stroke 1, has a first point 72 that constitutes the beginning of the curve segment and a second point 73 that constitutes the end of the curve segment. A straight line 74 is drawn experimentally between the first and the second points. If the maximal distance 76 between this line 74 and any point 75 on the curve segment 71 is less than a limit value $D_{limit}$, the curve segment is considered to be able to be replaced by the straight line. A straight line can be represented by considerably less data than a curve segment, whereby the saving in storage space is obvious. If, on the other hand, the maximal distance 76 exceeds the limit value $D_{limit}$, which is the case in FIG. 7, a first shorter line 87 is created (see FIG. 8) between the start point 72 and an intermediate point on the curve segment (in this case said point 75) and a second shorter line 88 is created between this intermediate point 75 and the end point 73, the above procedure being repeated on these shorter lines.

Figure 8:
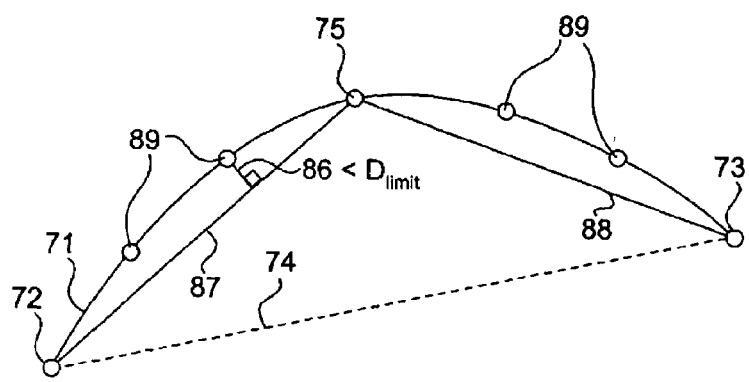

As shown in FIG. 8, the maximal distance 86 between the first shorter line 87 and any intermediate point 89 is now less than the limit value $D_{limit}$, so all the intermediate points 89 are replaced by the first shorter line 87. In a corresponding way, the second shorter line 88 replaces corresponding points 89 between the point 75 and the end point 73.

After resampling has been completed, only the points 72, 73, 75 that have not been replaced by a line are saved or marked. The other points 89 are eliminated or left unmarked. The curve segment 71 is thus represented by these points 72, 73, 75 remaining after resampling.

Figure 6:
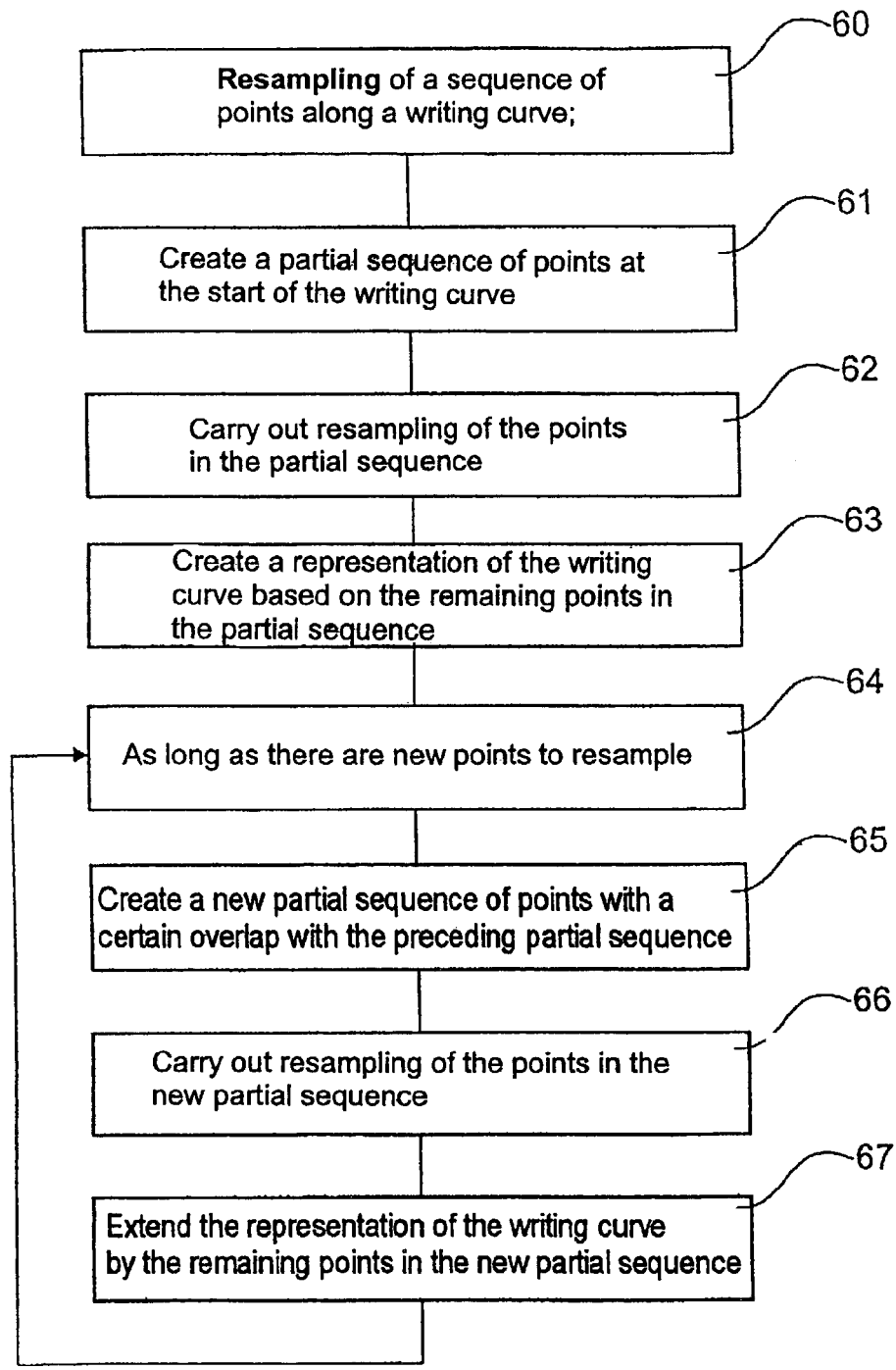
FIG. 6 is a flow chart of the resampling according to the invention.
Figure 10:
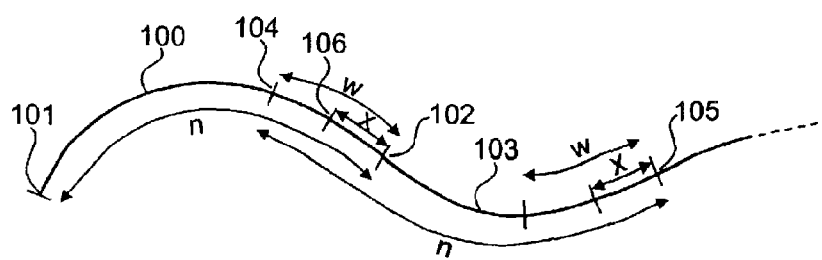
FIG. 10 illustrates how resampling according to the preferred embodiment is carried out on two successive and partially overlapping partial sequences of points (that is two partially overlapping curve segments of a writing curve).

The resampling according to the preferred embodiment will now be further clarified with reference to FIGS. 6 and 10. The resampling procedure 60 is commenced with a step 61, in which a partial sequence 100 (see FIG. 10) of points in an initial segment of the total writing curve is read into the coordinate buffer 6 in the pen's 10 working memory 5 (see FIG. 4). Resampling according to Douglas-Peucker is then carried out in a step 62 for all the points in the partial sequence 100, starting at a point 101 and ending at a point 102. After the resampling, all points that are to be retained are marked in the coordinate buffer 6 in the way described above.

In a step 63, a not yet complete representation of the resampled writing curve is created on the basis of the first n−x points from the coordinate buffer 6, where n is the length of the coordinate buffer 6 and x is a considerably smaller value than n, for example a twentieth. More specifically, the representation will consist of the points, from the total n−x points, that were marked in the resampling step 62. The significance of the parameter x will be clarified later with reference to FIGS. 9 and 10. The representation of the sampled writing curve can either be stored in the permanent memory 7 awaiting the whole writing curve having been resampled, or—which is preferable—be stored temporarily in the working memory 5 ready to be supplied as input data for subsequent difference coding and statistical coding (cf. step 53 in FIG. 5). The latter alternative has the advantage that the total processing of the electronic handwriting takes a shorter time, as the processing of a part of the writing curve can be carried out as soon as a sufficient number of digitized points are available, even if the user pauses during the writing movement 1.

The step 63 is concluded by the first n−w points in the coordinate buffer 6 being deleted, where w is larger than x but considerably smaller than n. At the same time, the w remaining points are moved to the start of the coordinate buffer 6—either by physical copying/movement of data or by utilizing the coordinate buffer 6 cyclically and letting a pointer indicate where the buffer starts.

In step 64, an iterative loop is commenced, which continues as long as there are still incoming (that is newly digitized) points left to process. In a step 65, a new partial sequence of points is created, by the coordinate buffer 6 being filled up until it is full. On account of the w remaining points from the previous partial sequence, the new partial sequence—which consists of all the points in the coordinate buffer 6—will partially overlap the previous partial sequence, more specifically with an overlap of w points. The new partial sequence (during the first iteration of the loop 65–67) is designated 103 in FIG. 10 and extends as shown between a start point 104 (located w points before the end point 102 of the first partial sequence 100) and an end point 105.

In a step 66, resampling is then carried out according to Douglas-Peucker for the new partial sequence, that is the points in the coordinate buffer 6. The remaining points are marked as in step 62.

In a step 67, the representation of the resampled writing curve created in step 63 is now extended by adding at the end of the representation the remaining/marked points of the points from the coordinate buffer 6, with the exception of marked points from the first w−x points and the last x points. This means that the transition between the new partial sequence 103 and the old partial sequence 100, as regards how the results from the resamplings of these partial sequences are successively added to the representation of the resampled writing curve, will lie at 106 in FIG. 10.

In addition, the first n−w points in the coordinate buffer 6 are deleted and the remaining w points are moved to the start of the buffer by analogy with step 63. The execution thereafter returns to step 64 for a new iteration of the loop 65–67.

In a concluding step not illustrated in FIG. 6, the representation of the resampled writing curve is completed by adding at the end of the representation marked points of the last x points from the coordinate buffer 6. Thus, a complete, resampled representation of the writing curve is obtained.

It should be noted that all the Douglas-Peucker resamplings are carried out on "fresh" points, that is the w points from the preceding sampling do not retain any marks.

The resampling procedure 60 described above can be implemented by the following pseudo-code:

```
Fill buffer with points;        // (length n)
Douglas-Peucker ( );            // Mark all points in the buffer that
                                   are to be saved
StorePoints (1, n-x);           // Save marked points of the first n-x
                                   points in the buffer
RemovePoints (n-w);             // Delete first n-w points in the
                                   buffer and move the remaining
                                   points to the start of the buffer
While (Points left)
    Fill buffer with points;
    Douglas-Peucker ( );        // Mark all points in the buffer
                                   that are to be saved
    StorePoints (w-x, n-x);     // Save marked points
    RemovePoints (n-w);
End While
StorePoints (n-x+1, n);         // Save the remaining marked points
```

The values of w and x can be selected to suit the application concerned, however such that x<w, w>1, w<=n/2.

n is set in the preferred embodiment to 128. x is selected as w/2.

For a sampling frequency of 80 Hz, w should≈n/10. Experience shows that a relatively larger w is required for higher sampling frequencies.

Figure 9:
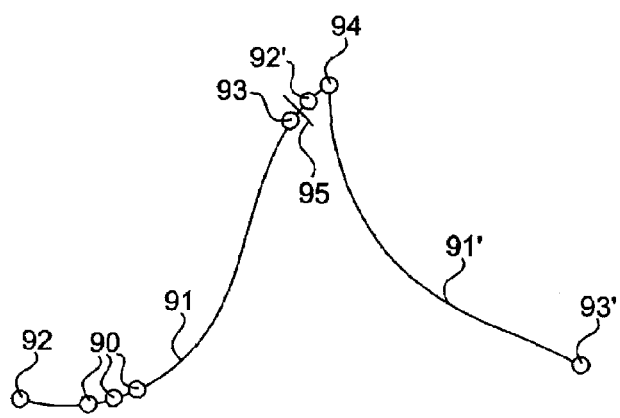
FIG. 9 illustrates a part of a writing curve that contains a "knot point"—that is a point that represents a sharp bend or sudden change of direction in the handwriting.

FIG. 9 illustrates an exemplifying scenario, where a writing curve for some reason (for example, insufficient size of the coordinate buffer) is divided into a first partial sequence 91 of points 90 (start point 92, end point 93) and a second partial sequence 91' (start point 92', end point 93') with a joint without an overlap at 95. The second partial sequence 91' contains a "knot point" 94, which is located immediately at the start of the partial sequence. If the Douglas-Peucker's algorithm is applied to these partial sequences 91, 91', there is a danger of artefacts at the "knot point" 94, that is there is a danger that this point is unintentionally eliminated during resampling and that information that is valuable for legibility is lost.

Due to the fact that the resampling operations according to the invention are carried out on the partially overlapping partial sequences 100, 103, the sequence of points that are taken into account during the resampling is enlarged. In particular, the sequence is enlarged so that it also includes the last w points from the preceding partial sequence, whereby a "knot point" 94 is given a "fairer" evaluation and is identified as the point worthy of being marked that it actually is. Since in the creation of the resampled representation of a particular partial sequence, marked points that lie among the first w−x points and the last x points in the coordinate buffer are excluded (cf. step 67 in FIG. 6), and it could be said that these points are given to the preceding or subsequent resampling step to deal with, any "knot points" both before and after the transition 106 between consecutive partial sequences 100, 103 are taken into account.

For this reason, x is advantageously selected "symmetrically" in relation to the window w, that is x=w/2, so that the same account is taken of points at the immediate commencement of a partial sequence as at the immediate end.

The resampling method according to the invention thus reduces, automatically, the danger of an artefact at a "knot point", irrespective of whether it is located at the immediate commencement of a partial sequence (like point 94) or at the end of a partial sequence (that is just before the end point 93 in FIG. 9). The invention has here an evident advantage in comparison with U.S. Pat. No. 6,101,280, in which "knot points" must be located explicitly prior to the resampling.

The sampling procedure 60 described above utilizes overlapping resampling using Douglas-Peucker (steps 62 and 66 respectively, overlap=w points) but with non-overlapping successive storage of results from the resamplings (steps 63 and 67 respectively), where the parameter x indicates 106 the "joint" between successive stored results (see 106 in FIG. 10). In an alternative embodiment, the parameter x is set to 0, which has the result that both resampling and storage are carried out with the same overlap of w points between two partial sequences. Before storage, an OR operation is carried out for this overlapping area, so that an individual point is included during storage if it has been marked during the resampling of at least one of the partial sequences.

The invention has been described above in the form of a few exemplifying embodiments. However, the invention is in no way limited to these, but covers many other variants, according to what is defined by the scope of protection of the appended claims and, in addition, can easily be recognized by a person skilled in the art. For example, other line-generalization or polygonal approximation algorithms or techniques than Douglas-Peucker can be used for the resampling according to the invention. Some examples of such possible techniques are Jenk's algorithm, Reumann–Witkam's algorithm, so-called "Coordinate-Averaging" or fractal techniques such as "Walking-Divider".

What I claim and desire to secure by Letters Patent is:

1. A method for recording of electronic handwriting, in which a handwriting movement is digitized into a sequence of points along a writing curve that corresponds to the handwriting movement, the method comprising:

resampling the sequence of points by eliminating those points judged not to be necessary to reconstruct the writing curve later with a predetermined visual quality; and creating a resampled representation of the writing curve from the non-eliminated points after the resampling, wherein the resampling is carried out on successive and partially overlapping partial sequences of the sequence of points, and the resampled representation of the writing curve is extended successively after resampling of a respective partial sequence.

2. The method as claimed in claim 1, wherein the resampling is carried out according to an algorithm for polygonal approximation of the writing curve, such that a curve segment between two consecutive non-eliminated points is represented by a straight line.

3. The method as claimed in claim 2, in which said algorithm is the Douglas-Peucker's algorithm.

4. The method as claimed in claim 1, wherein:

a partial sequence of points includes n points, with an overlap between two consecutive partial sequences of w points, where 1<w<=n/2, and an individual partial sequence is stored during the resampling in a memory buffer with room for n points, and the last w points in this individual partial sequence being left in the memory buffer and being included in the resampling of a next following partial sequence.

5. The method as claimed in claim 4, further comprising:

adding, after the resampling of said individual partial sequence, the non-eliminated points in the memory buffer to the resampled representation of the writing curve, with the exception of the non-eliminated points from a subset of said last w points in said individual partial sequence, the subset consisting of x points, which instead are included in the resampling of a next following partial sequence as regards addition to the resampled representation of the writing curve.

6. The method as claimed in claim 5, comprising the steps of a) filling the memory buffer with points;
b) applying a line-generalization algorithm to the points in the memory buffer, wherein such remaining points are marked which are not eliminated by the algorithm;
c) letting the marked points from the points 1 to n−x in the memory buffer be incorporated in the resampled representation of the writing curve;
d) deleting the first n−w points in the memory buffer;
e) placing the remaining w points at the start of the memory buffer;
f) as long as points are available for resampling:
  f1) filling up the memory buffer with n−w new points;
  f2) applying the line-generalization algorithm to the points in the memory buffer, in accordance with step b);
  f3) letting the marked points from the points w−x to n−x in the memory buffer be incorporated in the resampled representation of the writing curve;
  f4) deleting the first n−w points in the memory buffer; and
  f5) placing the remaining w points at the start of the memory buffer;
g) letting the marked points from the remaining points n−1+x to n in the memory buffer be incorporated in the resampled representation of the writing curve.

7. A method as claimed in claim 6, wherein said line-generalization algorithm is the Douglas-Peucker's algorithm.

8. The method as claimed in claim 5, in which x=w/2.

9. The method as claimed in claim 5, in which n=128 and w≈n/10.

10. The method as claimed in claim 4, further comprising:

adding the non-eliminated points in the memory buffer after the resampling of said individual partial sequence to the resampled representation of the writing curve, such that the remaining points from the overlapping w points between two consecutive partial sequences are added to the resampled representation of the writing curve, if they are not eliminated during resampling of at least one of these two consecutive partial sequences.

11. The method according to claim 1, further comprising:

relative coding coordinates for the non-eliminated points corresponding to the resampled representation of the writing curve; and compressing the relative-coded coordinates using statistical coding.

12. The method as claimed in claim 11, wherein relative coding the coordinates for an individual non-eliminated point comprises:

approximating a polynomial of order N to the N+1 preceding non-eliminated points;

determining a prediction of said individual non-eliminated point using said polynomial;

determining a deviation between said individual non-eliminated point and its prediction; and using this deviation as a relative coding for said individual non-eliminated point.

13. The method as claimed in claim 1, further comprising:

storing the resampled representation of the writing curve as a data set in a memory.

14. The method as claimed in claim 1, in which the resampling is carried out as soon as the handwriting movement has been digitized into a predetermined number of points.

15. An apparatus for recording of electronic handwriting, comprising:

a digitizer that digitizes a handwriting movement into a sequence of points along a writing curve corresponding to the handwriting movement; and a resampling unit that eliminates those points in the sequence of points judged not to be necessary to reconstruct the writing curve later with a predefined visual quality, and creates a resampled representation of the writing curve from the non-eliminated points after the resampling, wherein the resampling unit resamples points for successive and partially overlapping partial sequences of points, and extends the resampled representation of the writing curve successively after resampling of a respective partial sequence.

16. The apparatus as claimed in claim 15, wherein the apparatus is in the form of an electronic pen.

17. A computer program product that can be directly read into a computer readable memory associated with a processor, comprising program code for carrying out the steps according to claim 1.

* * * * *